United States Patent [19]

Cobb, Jr. et al.

[11] Patent Number: 5,117,478
[45] Date of Patent: May 26, 1992

[54] DEVICE FOR REDIRECTING LIGHT THROUGH A HOLLOW TUBULAR LIGHT CONDUIT

[75] Inventors: Sanford Cobb, Jr., Saint Mary's Point; Michael J. Leite, Bloomington, both of Minn.

[73] Assignee: Minnesota Mining and Manufacturing Company, Saint Paul, Minn.

[21] Appl. No.: 657,526

[22] Filed: Feb. 19, 1991

[51] Int. Cl.⁵ .................................. G02B 6/00
[52] U.S. Cl. ...................... 385/133; 385/37; 385/42; 385/44; 385/45
[58] Field of Search ............... 350/96.01, 96.19, 96.26, 350/96.28, 96.32, 259, 260, 261, 262; 385/37, 42, 44, 45, 133

[56] References Cited

U.S. PATENT DOCUMENTS

| | | |
|---|---|---|
| 586,225 | 7/1897 | Belcher .............................. 350/259 |
| 2,248,638 | 7/1941 | Merton .............................. 350/259 |
| 2,844,998 | 7/1958 | Vincent .............................. 350/260 |
| 4,684,224 | 8/1987 | Yamashita et al. .............. 350/96.26 |
| 4,850,665 | 7/1989 | Whitehead ...................... 350/96.1 |

Primary Examiner—John D. Lee
Assistant Examiner—John Ngo
Attorney, Agent, or Firm—Gary L. Griswold; Walter N. Kirn; Stephen W. Buckingham

[57] ABSTRACT

When two hollow tubular light conduits are interconnected at a miter joint, beamed light can be redirected from one of the conduits to the other by a thin transparent prismatic element that is mounted to extend along the plane of the miter joint. When the interconnected conduits are acting as a luminaire, the miter joint can be fully illuminated by the transported light. A luminaire of unlimited length can be obtained by mounting a plurality of lamps and parabolic reflectors along a transparent hollow tubular light conduit and redirecting light from each lamp to be transported along the axis of the conduit in both directions.

9 Claims, 4 Drawing Sheets

DEVICE FOR REDIRECTING LIGHT THROUGH A HOLLOW TUBULAR LIGHT CONDUIT

BACKGROUND OF THE INVENTION

1. Field of the Invention

The invention concerns a device for redirecting beamed light while it is being transported through air in a hollow tubular light pipe or conduit. The invention is especially concerned with such devices that are designed to function as a luminaire.

2. Description of the Related Art

U.S. Pat No. 4,260,220 (Whitehead) reports three prior methods of directionally transporting beamed light through a hollow tubular light pipe or conduit:

"A first method, as exemplified by U.S. Pat. No. 3,506,331 which issued to R. Kompfner on Apr. 14, 1970, is to use focusing lenses or mirrors at intervals down a hollow pipe. In a second method, a hollow pipe with a mirrored inner surface is used to keep the light traveling down the pipe, such a pipe is shown in U.S. Pat. No. 3,700,900 which issued to G. A. Herleikson on Oct. 22, 1972. In a third method which is illustrated in U.S. Pat. No. 3,583,786 issued to E. A. G. Marcatili on June 8, 1971, the pipe consists of an inner cylinder, usually air, surrounded by pairs of dielectric layers wherein the losses are purported to decrease with the number of layers."

The Whitehead patent concerns a fourth method wherein the hollow tubular light pipe or conduit is a rectangular structure of transparent dielectric material having planar inner and outer surfaces which are in "octature," i.e. the outer planar surfaces form 90 degree angle corrugations, the faces of which extend at 45 degrees to the other surface. This hollow tubular light guide or conduit is said to provide "total internal reflection" (TIR). Because some of the beamed light inevitably leaks out through the transparent walls, Whitehead's device acts as a luminaire, even though nothing is said about it doing so.

A second Whitehead patent, U.S. Pat. No. 4,615,579, concerns modifying the structure of the first patent so that it releases the transported light in a controlled manner through one or more walls of the structure to enhance its utility as a luminaire. Even when so releasing light, the structure can be called a "hollow TIR conduit" because it incorporates principles of total internal reflection.

Coassigned U.S. Pat. No. 4,805,984 (Cobb) likewise directionally transports beamed light through a hollow TIR conduit that differs from those of the Whitehead patents in that the cross section of its wall lies in a smooth arcuate curve (preferably circular in cross section), and its structured surface consists of a linear array of substantially right-angled isosceles prisms arranged side by side. The perpendicular sides of each prism make angles of approximately 45 degrees with the tangent to the adjacent smooth surface opposite the structured surface. Imperfections in the wall member of the hollow TIR conduit of the Cobb patent allow some of the transported light to escape through the wall member so that the TIR conduit can act as a luminaire.

The TIR conduit of Cobb '984 can be made from the thin, flexible film disclosed in coassigned U.S. Pat. No. 4,906,070 (Cobb). Such a film is currently marketed as SCOTCH ™ Optical Lighting Film No. 2300 acrylic (from 3M Co.) and reflects light rays at angles of incidence up to 27.3 degrees to its smooth surface. In a hollow TIR conduit of the N2300 acrylic lighting film, 50 percent of a beamed light can be transported a distance 60 times the diameter of the tube. When the hollow TIR conduit is to be used as a luminaire, the escape of light can be enhanced by adhering SCOTCH ™ light extractor film V5115 to the inner face of the hollow TIR conduit in areas where light release is desired.

For use as a luminaire, a TIR conduit is mounted in a housing, and a lamp and paraboloidal reflector are mounted at one end of the housing. At the other end is either a second lamp or a mirror. The housing can be transparent in some areas and opaque in others, and the opaque areas can be covered by reflective material.

Because paraboloidal reflectors are usually called "parabolic reflectors," the latter term is used here. Parabolic reflectors are only substantially paraboloidal for reasons well known in the art.

In spite of the availability of hollow TIR conduits, almost all luminaires in current use are fluorescent lamps. For example, fascia signs are often lighted by strings of fluorescent lamps, but areas between adjacent lamps may be poorly lighted, and the failure of one lamp is highly conspicuous.

Luminaires based on known hollow TIR conduits involve the same problems, except that the length of a single hollow TIR conduit can be much greater than is feasible for a fluorescent lamp. Another advantage of a TIR luminaire versus fluorescent is that two lengths of a TIR conduit can be interconnected at an angle, and a mirror could be positioned at their juncture to redirect the light from one to the other. However, the areas of their wall members behind the mirror would be shielded from the light, thus leaving a dark area in the otherwise lighted luminaire.

While neon luminaires can be bent and exceedingly long, they are expensive and involve other shortcomings.

Other Prior Art

U.S. Pat. No. 4,557,565 (Ruck et al.) discloses a transparent panel consisting of a series of linear prism facets that is used to illuminate a room by deflecting sunlight, e.g., onto the ceiling. That type of transparent prismatic panel could be used as the light-redirecting prismatic element of a hollow tubular light conduit of the present invention to redirect light 90 degrees.

SUMMARY OF THE INVENTION

The invention provides a device for redirecting a beamed light to be transported along the axis of a hollow tubular light conduit such as a TIR conduit, which device provides a number of improvements over prior devices. For example, when two TIR conduits are joined at an angle so that their axes intersect, the joint can be fully illuminated by the transported light. The invention also provides a luminaire of unlimited length that can remain illuminated over its entire length in spite of the failure of one or more lamps by which it is being illuminated.

Briefly, the light-redirecting device of the invention includes a source of beamed light, preferably one emitting light substantially within a cone that can be efficiently transported by the novel light-redirecting device, a hollow tubular light conduit, the axis of which is intersected by the axis of the beamed light, and a thin transparent prismatic element mounted in the tubular light conduit to intercept and redirect the beamed light along the axis of the tubular light conduit. The source of beamed light preferably emits light substantially within a cone having a half angle of about 27 degrees.

When a prismatic element is to be located at the juncture of two hollow tubular light conduits, the prismatic element preferably extends at equal angles to the axes of the beamed light and of the tubular light conduit, because this simplifies the construction of the joint. When a prismatic element is to be used to redirect a beam of light into a side of a hollow tubular light conduit, it may be desirable to minimize the distance that it projects into the conduit so as to limit its interference with light already being transported by the conduit.

Preferably said hollow tubular light conduit is a TIR conduit of transparent dielectric material and is constructed as taught in the Cobb '984 patent That is, the cross section of all of the TIR conduit lies in a smooth arcuate curve, and the TIR conduit has a structured surface consisting of a linear array of substantially right-angled isosceles prisms arranged side by side, the perpendicular sides of each prism making angles of approximately 45 degrees with the tangent to the adjacent smooth surface opposite the structured surface. However, the hollow tubular light conduit need not be a TIR conduit and could have a substantially rectangular shape.

The source of beamed light can be a lamp with a parabolic reflector that is mounted on a hollow TIR conduit, with the axis of the parabolic reflector intersecting the axis of the TIR conduit at an angle of 90 degrees. With the prismatic element extending part way into the TIR conduit, the beamed light can be redirected in the direction of the axis of the TIR conduit. With two such thin transparent prismatic elements so mounted to extend at opposite angles to the axis of the TIR conduit, the beamed light can be redirected in opposite directions through the TIR conduit. Because the prismatic elements are transparent, light already being transported by the TIR conduit that strikes one of the prismatic elements is redirected toward the parabolic reflector, and a high proportion of that light is usefully redirected by the reflector.

By mounting a plurality of lamps, parabolic reflectors, and pairs of said thin transparent prismatic elements in like manner at intervals along the TIR conduit, the TIR conduit can have virtually unlimited length. When the spacing between adjacent lamps is such that light emitted by each diminishes about 50 percent before reaching the position of the adjacent lamp and the TIR conduit is designed to function as a luminaire, the illumination can be almost uniform along the full length of the TIR conduit. Even if some of the lamps were to burn out, the TIR conduit would be illuminated along its full length.

A light-redirecting device of the invention can include first and second hollow TIR conduits that are joined at an angle so that their axes intersect. A lamp with a parabolic reflector is mounted at one end of the second TIR conduit so that the axis of the parabolic reflector coincides with the axis of the second conduit. The second conduit then becomes a source of beamed light for the first.

When the novel light-redirecting device redirects light at an angle of at least 45 degrees, the transparent prismatic element can be of a construction employing both TIR and refraction. When the device redirects light at an angle not exceeding 60 degrees, the transparent prismatic element can be entirely refractive. When it redirects light at an angle between 45 degrees and 60 degrees and the prismatic element is entirely refractive, highest efficiency is attained when the prismatic element consists of two pieces of plastic film.

BRIEF DESCRIPTION OF THE DRAWINGS

The invention may be more easily understood in reference to the drawings, all figures of which are schematic. In the drawings.

DESCRIPTION OF THE PREFERRED EMBODIMENTS

Figure 1:
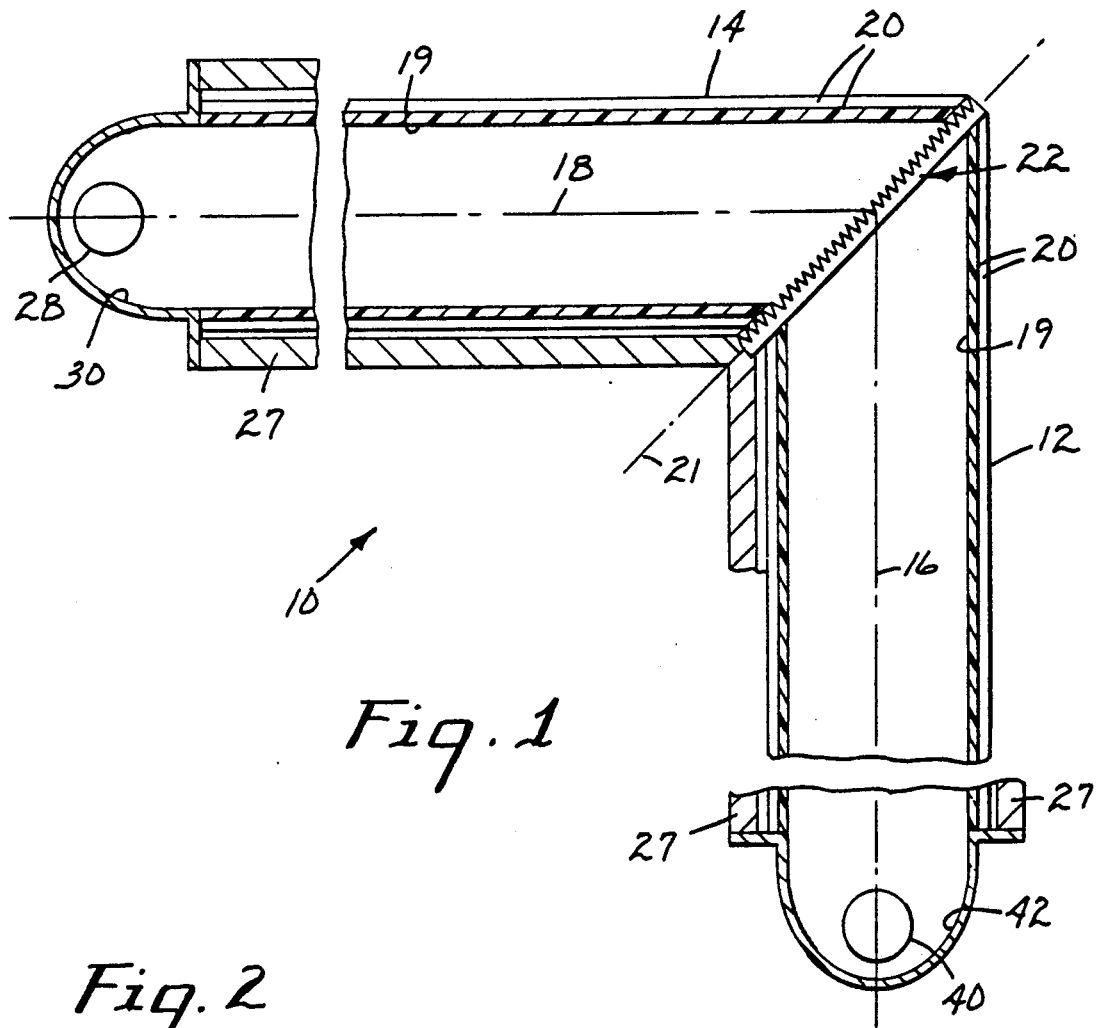
FIG. 1 is a schematic cross section through fragments of a luminaire incorporating a first light-redirecting device of the invention, which device includes two hollow TIR conduits that are joined at a miter joint to redirect beamed light that is being transported through air.
Figure 2:
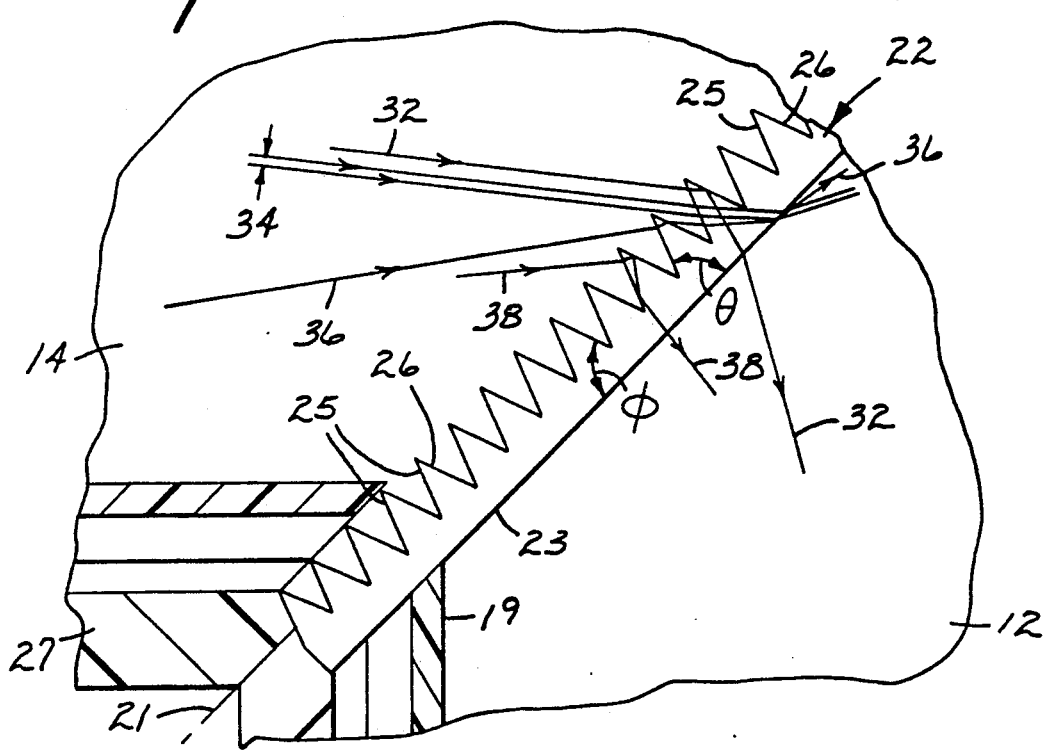
FIG. 2 shows a fragment of the thin transparent prismatic element at the miter joint of the device of FIG. 1, greatly enlarged and indicating the passage of rays of light.

In FIGS. 1 and 2, a light-redirecting device 10 includes first and second hollow, circular, cylindrical TIR conduits 12 and 14 that have axes 16 and 18, respectively, and are of equal diameter. Each of the TIR conduits is a transparent dielectric material and is constructed as taught in the Cobb '984 patent. The inner surface 19 of each TIR conduit is smooth, and its outer surface 20 is a structured surface consisting of a linear array of substantially right angled isosceles prisms arranged side by side. The perpendicular sides of each prism make angles of approximately 45 degrees with the tangent to the adjacent smooth surface opposite the structured surface. Light incident on an inner surface 19 within an angle of about 27 degrees to the axis 16 is reflected back into the TIR conduit 12, while light incident at a larger angle may be leaked or transmitted through the transparent wall of the TIR conduit, thus making the device 10 a luminaire, although the leaking light may be quite dim.

The cylindrical TIR conduits 12 and 14 are interconnected at an angle of 90 degrees to form a miter joint of 45 degrees, and their axes 16 and 18 intersect at the plane 21 of the miter joint. A thin transparent prismatic element 22 is mounted on the TIR conduits to extend completely across the TIR conduits along the plane 21 and at equal angles to the axes 16 and 18. The prismatic element has a flat surface 23 and a structured surface of identical linear prisms having planar facets 25 and 26 extending at angles of φ and θ, respectively, to the flat surface 23. The prismatic element employs both TIR and refraction.

The TIR conduits 12 and 14 are mounted in a housing 27, all or part of which is transparent to function as a luminaire. A lamp 28 and parabolic reflector 30 that produce beamed light within a cone having a half angle of about 27 degrees are mounted on the housing at the free end of the second TIR conduit 14 opposite to the transparent prismatic element 22, with the axes of the parabolic reflector and second TIR conduit coaxial.

As shown in FIG. 2, one ray 32 of the beamed light is refracted as it enters a facet 25 of a prism, totally internally reflected by the other facet 26 of the prism, and refracted again as it emerges from the flat surface 23 of the transparent prismatic element to be transmitted into the first TIR conduit 12 within the acceptable cone for TIR light transportation.

Rays of light that are parallel to the ray 32 but lie within a narrow band 34 emerge from the transparent prismatic element outside the acceptable cone for transporting TIR light, so that these rays leak out through the first TIR conduit 12 and can enhance the utility of the device 10 as a luminaire, but might produce an undesirably bright area.

A light ray 36, is also refracted as it enters a facet 25 of a prism, but its angle of incidence with the other facet 26 of the prism is too small for total internal reflection, so that it too leaks out through the first TIR conduit 12.

A light ray 38 is refracted as it enters a facet 25 of a prism and totally internally reflected both at the other facet 26 of the prism and again at the first facet 25, ultimately emerging from the flat surface 23 of the transparent prismatic element within the cone for acceptably transporting light in the first TIR conduit 12.

Although a single lamp 28 and parabolic reflector 30 permit the light-redirecting device 10 to function as a luminaire, more uniform illumination is achieved when a second lamp 40 and parabolic reflector 42 are mounted at the free end of, and coaxially with, the first TIR conduit 12. By doing so, the gradual reduction in intensity at greater distances from the lamp 28 and reflector 30 is offset by the additive and oppositely decreasing effect of leakage from the other lamp 40 and reflector 42. Instead of the second lamp 40 and parabolic reflector 42, a mirror (not shown) can be placed across the free end the first TIR conduit 12. Regardless of whether there are two lamp reflectors, each of the TIR conduits 12 and 14 is completely illuminated, and there is no dark area such as would be encountered if the prismatic element 22 were to be replaced by a mirror mounted to extend orthogonally to the plane of the miter joint.

Figure 3:
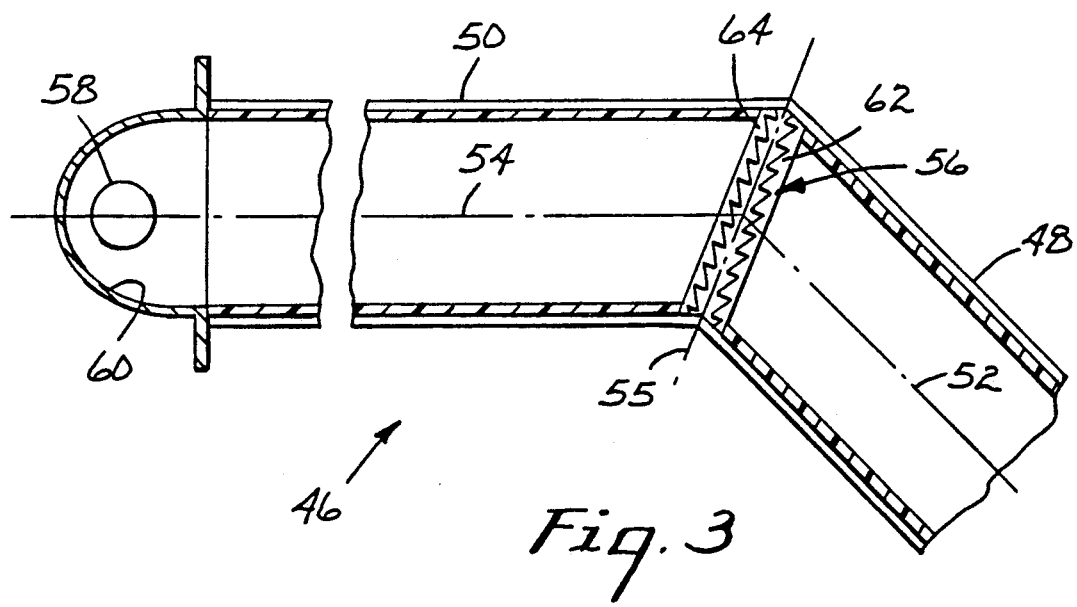
FIG. 3 is a schematic cross section through fragments of a second light-redirecting device of the invention.
Figure 4:
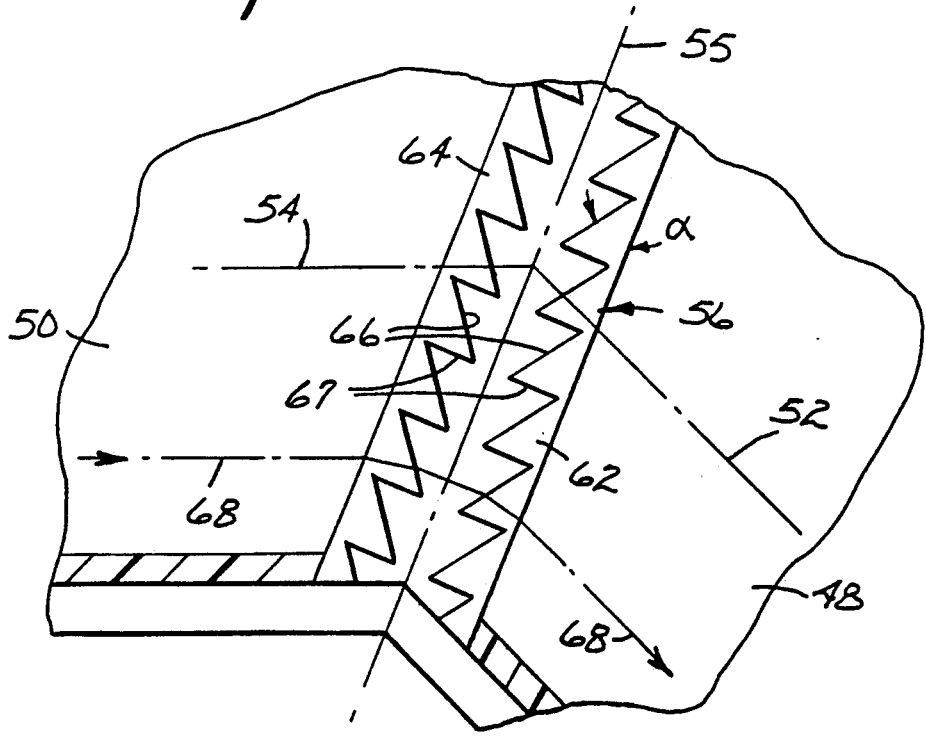
FIG. 4 shows a fragment of the thin transparent prismatic element at the miter joint of the device of FIG. 3, greatly enlarged and indicating the passage of a ray of light.

In FIGS. 3 and 4, a light-redirecting device 46 of the invention includes first and second hollow, circular, cylindrical TIR conduits 48 and 50 that have axes 52 and 54, respectively, and are of equal diameter. The TIR conduits 48 and 50 are transparent, constructed as taught in the Cobb '984 patent, and interconnected at an angle of 135 degrees, thus forming a miter joint of 67.5 degrees. Their axes 52 and 54 intersect at the plane 55 of the miter joint. A thin transparent two-member prismatic element 56 is mounted to extend along the plane 55 and at equal angles to the axes 52 and 54 of the first and second TIR conduits 48 and 50, respectively. At the free end of the the second TIR conduit 50 are mounted a lamp 58 and parabolic reflector 60 to be coaxial with the second TIR conduit 50.

The two members of the transparent prismatic element 56 are identical, entirely refractive, transparent plastic films 62 and 64 having inner-facing structured surfaces and outer-facing smooth surfaces. Each structured surface consists of identical linear prisms, each having a planar facet 66 at an appropriate angle α to effect a 22.5 degree redirection. That angle α is calculated from the relationship $$\tan \alpha = \frac{\sin \beta}{(n[\cos \arcsin(1/n \sin \beta)] - 1)}$$

where n is the index of refraction of the optical film material and β is one-half of the desired angle of redirection. The value of angle β is 22.5 degrees for the light-redirecting device 46 of FIGS. 3 and 4. When the transparent plastic films 62 and 64 are acrylic with an index of refraction of 1.49, a facet angle α of 41 degrees effects a redirection of 45 degrees.

In FIG. 4, a light ray 68 from the lamp 58 is shown traveling parallel to the axis 54 of the second TIR conduit and being refracted at each active facet 66 of the transparent plastic films 62 and 64, then emerging into the first TIR conduit 48 within its acceptable cone for transporting light. Active facets 66 are separated by risers, 67. Risers 67 do not play an active role in redirecting light and so are preferably positioned at angles such that they will not interrupt light in order to provide maximum efficiency.

Figure 5:
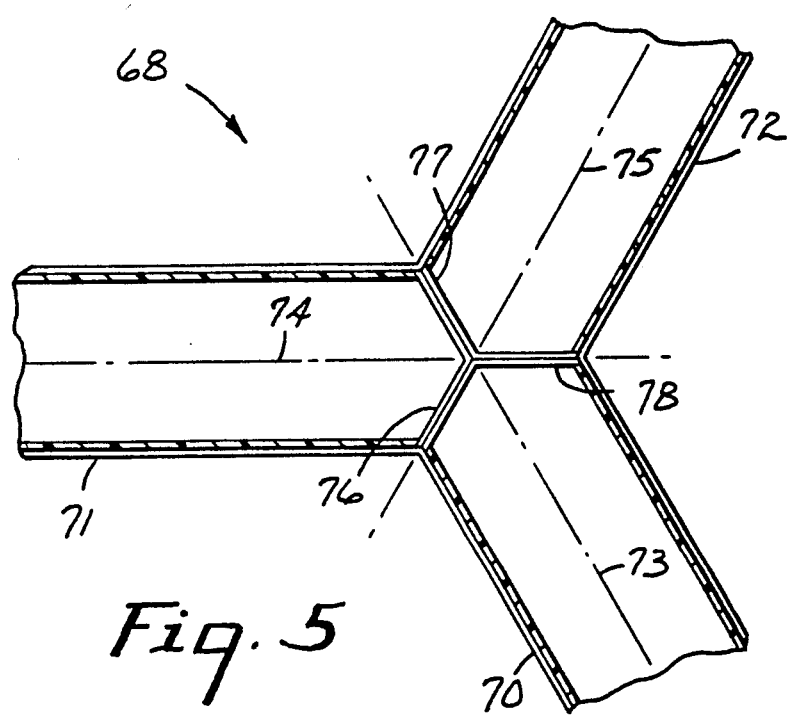
FIG. 5 is a schematic cross section through a fragment of a third light-redirecting device of the invention incorporating three interconnected hollow TIR conduits.
Figure 6:
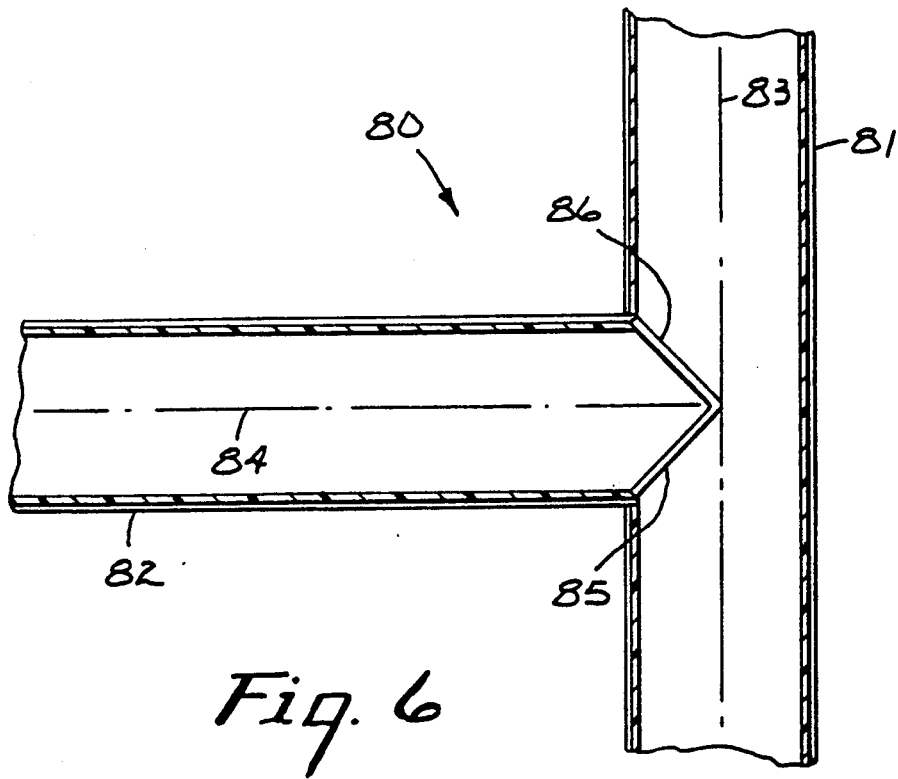
FIG. 6 is a schematic cross section through a fragment of a fourth light-redirecting device of the invention incorporating two TIR conduits that have a T-shaped interconnection.

In FIG. 5, a light-redirecting device 68 of the invention includes first, second, and third hollow, circular cylindrical TIR conduits 70, 71 and 72 of equal diameter. Each is transparent, constructed as taught in the Cobb '984 patent, and interconnected so that their axes 73, 74 and 75, respectively, intersect at a point. The interconnections form miter joints, the planes of which intersect each other at angles of 120 degrees. Extending along the planes of the miter joints are three thin transparent prismatic elements 76, 77 and 78, each of which is similar in construction to the prismatic element 22 of FIGS. 1 and 2 and employs both TIR and refraction. Light transported by each of the TIR conduits 70, 71 and 72 is redirected along the axis of each of the other two conduits In FIG. 6, a light-redirecting device 80 of the invention includes first and second hollow, circular, cylindrical TIR conduits 81 and 82 of equal diameter. One end of the second conduit 82 is connected to a central area of the first 81 to form a T-shaped interconnection with their axes 83 and 84 intersecting at an angle of 90 degrees. A pair of thin transparent prismatic elements 85 and 86 (each similar in construction to the prismatic element of FIGS. 1 and 2) are mounted at the interconnection, each extending in a plane that intersects the axes 83 and 84 at an angle of 45 degrees. Substantially all light which is being transported by one of the conduits 81 and 82 that strikes one of the prismatic elements 85 and 86 is redirected along the axis of the other conduit.

Figure 7:
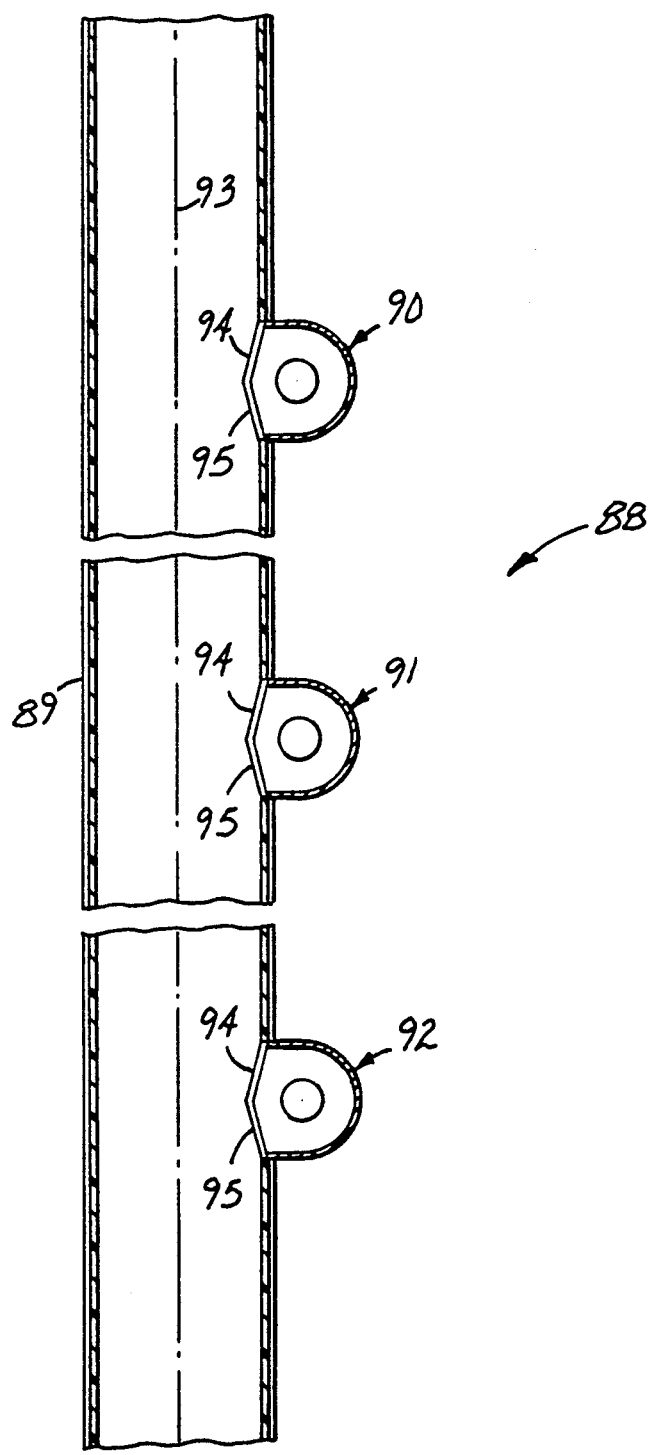
FIG. 7 is a schematic cross section through fragments of a fifth light-redirecting device of the invention including a hollow TIR conduit that transports light from a plurality of lamps.

In FIG. 7, a light-redirecting device 88 of the invention includes a single hollow, circular, cylindrical TIR conduit 89 which is transparent and constructed as taught in the Cobb '984 patent. Shown mounted on the TIR conduit are three sets of lamps and parabolic reflectors 90, 91 and 92 with the axis of each parabolic reflector intersecting the axis 93 of the TIR conduit 89 at an angle of 90 degrees. A pair of thin transparent prismatic elements 94 and 95 are mounted on the TIR conduit to intercept light from each set of lamps and parabolic reflectors. The prismatic elements intersect each other at a shallow angle and extend only a short distance into the TIR conduit to minimize interference with light already being transported by the TIR conduit. Another means for reducing interference is to reduce the size of the parabolic reflectors relative to the diameter of the TIR conduit. Preferably, adjacent sets of lamps and parabolic reflectors are spaced such that light emitted from each diminishes about 50 percent before reaching the positions of an adjacent set to enhance continuous illumination of the wall of the TIR conduit 89.

Example

A prototype of the light-redirecting device 10 of FIG. 1 and 2 has been constructed using SCOTCH TM optical lighting film No. 2300 acrylic with each of the TIR conduits 12, 14 having a diameter of about 7.5 cm and a length of 30 cm. The prismatic element 22 was compression molded of polymethylmethacrylate:

| | |
|---|---|
| n | 1.491 |
| θ | 62° |
| φ | 78° |
| thickness | 1.5 mm |
| prism height | 0.25 mm |

Using a 12-V, 50 watt lamp 28 and parabolic reflector 30 (EXN floodlamp) with a half-brightness angle of approximately 18 degrees, 61 percent of the light was transported from the free end of the second TIR conduit 14 to the open end of the first TIR conduit 12. For comparison, a straight conduit 60 cm in length transported 86 percent of the light to its open end. This indicates that the device 10 of this example had a light-redirecting efficiency of 71 percent.

Significantly better light-redirecting efficiency would have been achieved in this example by replacing the lamp and parabolic reflector with a source having a narrower beam of light such as an EXT spot which has a half-brightness angle of approximately 8 degrees.

When the prismatic element used in this example was tested with a helium-neon laser without a TIR conduit, it had a light-redirecting efficiency of 92 percent.

What is claimed is:

1. A device for redirecting a beam of light, said device comprising
   a source of beamed light including a parabolic reflector,
   a hollow tubular light conduit, the axis of which is intersected by the axis of the beamed light at an angle of 90 degrees, and
   a thin transparent prismatic element mounted in the tubular light conduit to intercept and redirect light from the lamp and parabolic reflector along the axis of the tubular light conduit, the prismatic element extending part way but less than all of the way across the light conduit.

2. A light-redirecting device as defined in claim 1 wherein a second thin transparent prismatic element is mounted at the TIR conduit to intercept light from the lamp and parabolic reflector while extending part way across the TIR conduit at an opposite angle to the axis of the TIR conduit.

3. A light-redirecting device as defined in claim 2 and further comprising a plurality of lamps, parabolic reflectors, and pairs of said thin transparent prismatic elements mounted in like manner at intervals along the TIR conduit.

4. A light-redirecting device as defined in claim 3 wherein the spacing between adjacent lamps is selected so that light emitted from each diminishes about 50 percent before reaching the position of an adjacent lamp.

5. A device for redirecting a beam of light, said device comprising
   a hollow cylindrical TIR conduit comprising transparent dielectric material,
   a plurality of lamps and parabolic reflectors mounted on the TIR conduit with the axis of each parabolic reflector intersecting the axis of the TIR conduit at an angle of 90 degrees,
   a pair of thin transparent prismatic elements mounted in the TIR conduit to intercept light from each lamp and parabolic reflector, each element extending part way into the TIR conduit at opposite angles to the axis of the TIR conduit to redirect light from said lamp in opposite directions through the TIR conduit, and
   adjacent lamps being spaced such that light emitted from each diminishes about 50 percent before reaching the position of an adjacent lamp.

6. A device for redirecting a beam of light, said device comprising
   first and second hollow tubular light conduits, each having an axis, said light conduits meeting such that said axes form a 90 degree angle and first light conduit terminating at the intersection of said conduits to form a T-shaped joint; and
   a pair of thin transparent prismatic elements mounted at the intersection of said light conduits and extending into said second light conduit each forming an angle of 45 degrees with each of said light conduit axes.

7. A device for redirecting a beam of light, said device comprising:
   first and second hollow tubular light conduits, each having an axis, said light conduits intersecting such that said axes form an angle that does not exceed 60 degrees; and
   a thin transparent prismatic element mounted at the intersection of said light conduits to intercept and redirect light beamed along said axis of said first light conduit along said axis of said second light conduit, said prismatic element operating entirely by refraction.

8. A light redirecting device comprising:
   first, second and third light conduits, each having an axis, said first second, and third light conduits being interconnected so that said axis intersect in a point; and
   three thin transparent prismatic elements each of which extends along the plane of one of the interconnections for redirecting light among said light conduits.

9. A light-redirecting device as defined in claim 8 wherein said interconnections form miter angles, the planes of which intersect at angles of 120 degrees with each other.

* * * * *